(12) United States Patent
Nystrom et al.

(10) Patent No.: US 7,684,095 B2
(45) Date of Patent: Mar. 23, 2010

(54) SCANNING APPARATUS HAVING AN ULTRAVIOLET LIGHT SOURCE

(75) Inventors: Brant Dennis Nystrom, Lexington, KY (US); Khageshwar Thakur, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1120 days.

(21) Appl. No.: 10/951,062

(22) Filed: Sep. 27, 2004

(65) Prior Publication Data

US 2006/0072171 A1    Apr. 6, 2006

(51) Int. Cl.
*H04N 1/46*    (2006.01)
*H04N 1/04*    (2006.01)

(52) U.S. Cl. .................... 358/514; 358/474
(58) Field of Classification Search ............ 347/129, 347/112, 111; D14/420, 356, 300, 453, 432; 368/62, 82, 223, 239, 241; 358/474, 471, 358/400, 514, 513, 505, 500
See application file for complete search history.

(56) References Cited

U.S. PATENT DOCUMENTS

| | | | | |
|---|---|---|---|---|
| 2,114,163 A | * | 4/1938 | Bird | 250/368 |
| 2,888,593 A | * | 5/1959 | Anderson et al. | 315/1 |
| 3,622,396 A | | 11/1971 | Fernandez | |
| 4,536,988 A | * | 8/1985 | Hogen | 47/1.5 |
| 5,349,199 A | * | 9/1994 | Rabjohns et al. | 250/559.29 |
| 5,407,711 A | * | 4/1995 | Lovison et al. | 428/13 |
| 5,488,456 A | * | 1/1996 | Jamzadeh | 399/45 |
| 5,696,835 A | | 12/1997 | Hennessey et al. | |
| 5,915,518 A | * | 6/1999 | Hopwood et al. | 194/207 |
| 5,963,513 A | * | 10/1999 | Lemelson | 369/14 |
| 5,997,737 A | * | 12/1999 | Sturdevant et al. | 210/170.11 |
| 6,123,263 A | | 9/2000 | Feng | |
| 6,536,672 B1 | | 3/2003 | Outwater | |
| 6,702,881 B2 | | 3/2004 | Hano et al. | |
| 2002/0102107 A1 | * | 8/2002 | Hull | 399/19 |
| 2003/0035149 A1 | * | 2/2003 | Ishikawa et al. | 358/302 |
| 2003/0081824 A1 | * | 5/2003 | Mennie et al. | 382/135 |
| 2003/0146945 A1 | * | 8/2003 | Inui et al. | 347/7 |

OTHER PUBLICATIONS

S. Jae Yang; Scantastic!; Aug. 1, 2002; PC Mag; Online.*

* cited by examiner

*Primary Examiner*—Gabriel I Garcia

(57) ABSTRACT

A scanning apparatus includes a scan bar configured to generate image data to reproduce a document scanned by the scanning apparatus. The scan bar includes a light source and a plurality of light sensors. The light source and the plurality of light sensors define at least one ultraviolet light channel and at least one visible light channel. The light source may emit visible light and ultraviolet light. The plurality of light sensors may be configured to allow the scanning apparatus to distinguish between the visible light and the ultraviolet light.

24 Claims, 2 Drawing Sheets

SCANNING APPARATUS HAVING AN ULTRAVIOLET LIGHT SOURCE

BACKGROUND OF THE INVENTION

1. Field of the Invention

The present invention relates to a scanning system, and, more particularly, to a scanning apparatus having an ultraviolet light source.

2. Description of the Related Art

A scanning apparatus is used to optically scan documents to generate corresponding image data. One such scanning apparatus, commonly referred to as a flatbed scanner, includes a scan bar that is moved relative to a stationary document to obtain scan data related to the document. Another type of scanner has a stationary scan bar, and the document is moved relative to the scan bar to obtain scan data related to the document.

Such scanning apparatus typically have a light source projecting light on the scan target and a sensor unit that records light reflected from the target. The target data is then translated to image data is some meaningful image format. Such image data may be forwarded, for example, to an imaging apparatus, such as a printer, or may be transferred to another device, such as a computer or facsimile device.

The light source and the sensor unit operate in only the visible range of the light spectrum, typically using red, green and blue (RGB) components. For example, in a CIS (Contact Image Sensor) scanner, the light source is made up of three LEDs emitting red, green and blue colors. As another example, in a CCD (Charge Coupled Device) scanner, there is only one light source continuously emitting white light, and the RGB channels are separated by sensors that are fitted with RGB filters.

In such scanning apparatus, it is difficult to provide automatic page location/skew detection and/or print media type detection, since often the print media cannot be distinguished from the document pad on which the document is supported during scanning. Further, for example, in such prior scanning systems, it remains difficult to provide ink type detection.

What is needed in the art is an improved scanning apparatus that addresses such deficiencies of the prior art.

SUMMARY OF THE INVENTION

The present invention provides a scanning apparatus that is capable of distinguishing between materials having different ultraviolet light responses.

The present invention, in one form thereof, is directed to a scanning apparatus, including a light source and a plurality of light sensors. The light source and the plurality of light sensors define at least one ultraviolet light channel and at least one visible light channel.

The present invention, in another form thereof, is directed to an imaging apparatus, including an imaging device and a scanning apparatus communicatively coupled to the imaging device. The scanning apparatus includes a light source and a plurality of light sensors. The light source and the plurality of light sensors define at least one ultraviolet light channel and at least one visible light channel.

An advantage of the present invention is that the scanner apparatus may be used to distinguish between different materials, such as for example, the document and the document pad on which the document is supported, different print media types, and/or different ink types.

Another advantage, in some embodiments of the present invention, is that the document location/skew may be readily determined.

Another advantage, in some embodiments of the present invention, is that image content on the print media may be readily determined.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
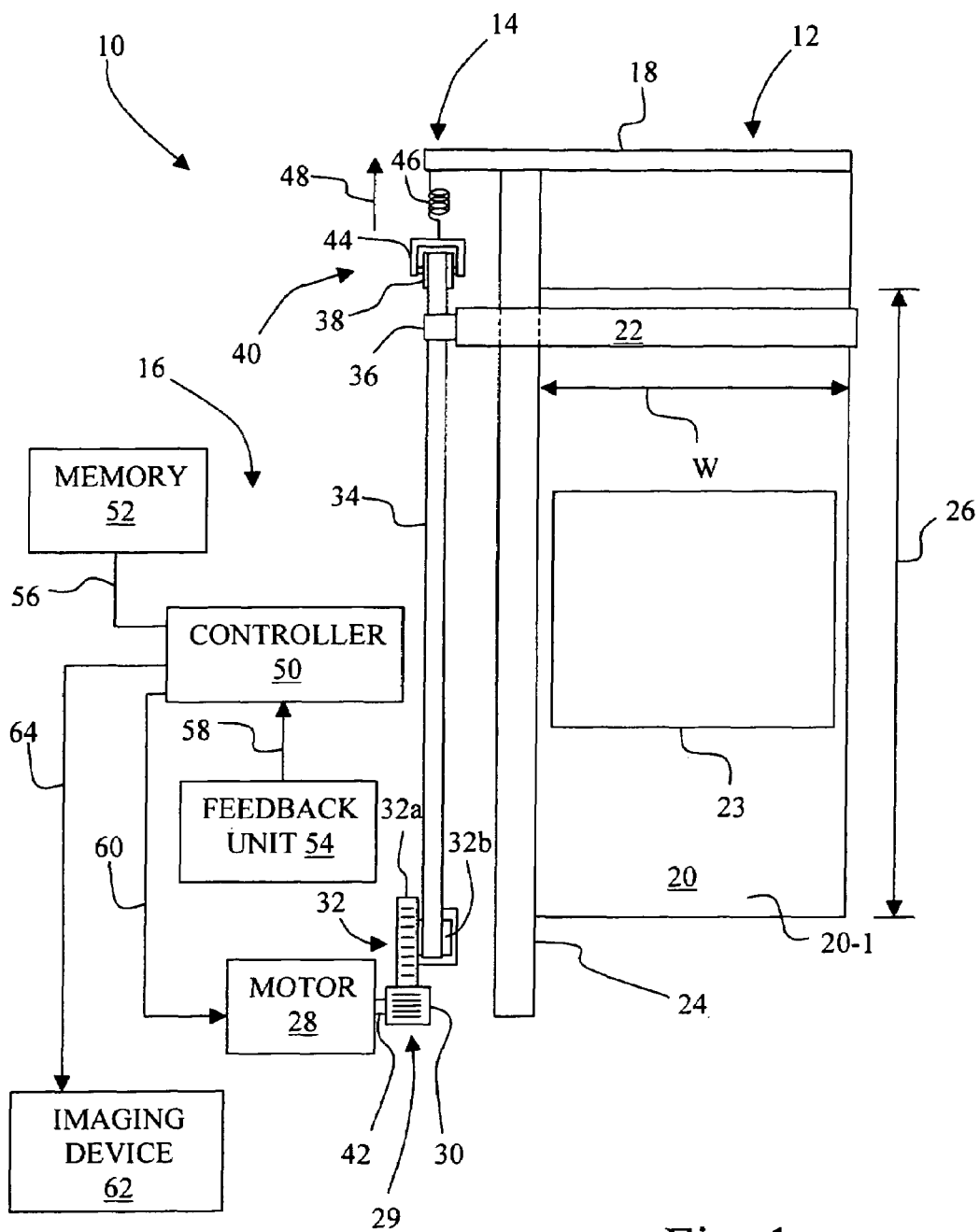
FIG. 1 is a diagrammatic illustration of a scanning apparatus embodying the present invention.

Referring now to the drawings and particularly to FIG. 1, there is shown a diagrammatic illustration of an exemplary scanning apparatus 10 in accordance with the present invention. Scanning apparatus 10 includes a scanning device 12, a drive unit 14 and a control unit 16.

Scanning device 12 includes a housing 18, a document pad 20 and a scanner 22. Document pad 20 provides support for a document 23 that is positioned between scanner 22 and document pad 20. Scanner 22 is moveably coupled to housing 18 via a support rod 24. Scanner 22 is configured to move over a scanning range 26, as depicted by the vertical double-headed arrow. Scanner 22 may be, for example, a CIS scanner or a CCD scanner.

Drive unit 14 includes a scan motor 28 and a drive train 29. Scan motor 28 may be, for example, a DC motor or a stepper motor. Drive train 29 may include, for example, a pinion gear 30, a driven gear/drive pulley arrangement 32, a toothed belt 34, a scanner attachment device 36, an idler pulley 38 and a belt tensioning device 40. Pinion gear 30 is attached to a rotatable shaft 42 of scan motor 28. Pinion gear 30 is position to mesh with a driven gear portion 32a of driven gear/drive pulley arrangement 32. A toothed drive pulley 32b of driven gear/drive pulley arrangement 32 includes teeth for engaging the teeth of toothed belt 34. Scanner attachment device 36 attaches scanner 22 to toothed belt 34.

Idler pulley 38 and a belt-tensioning device 40 take up slack in toothed belt 34 to facilitate the transfer a linear motion to scanner 22 along scanning range 26. Accordingly, toothed belt 34 is suspended between toothed drive pulley 32b and idler pulley 38. Belt tensioning device 40 may include a yoke 44 mounted to idler pulley 38, and a spring 46 connected between housing 18 and yoke 44, so as to apply a force in direction 48 to maintain toothed belt 34 in a state of tension.

Control unit 16 includes a controller 50, a memory 52 and a feedback unit 54.

Controller 50 may be, for example, formed as an application specific integrated circuit (ASIC), and includes processing capability, which may be in the form of a microprocessor having an associated random access memory (RAM), non-volatile RAM (NVRAM) and/or read only memory (ROM), which may be included in memory 52.

Controller 50 is communicatively coupled to memory 52 via a communication link 56. Controller 50 is communicatively coupled to feedback unit 54 via a communications link 58. Feedback unit 54 provides information to controller 50 relating to the actual position of scanner 22 along scanning range 26. Controller 50 is further communicatively coupled to scan motor 28 via a communications link 60. As used herein, the term "communications link" is used to generally refer to structure that facilitates electronic communication between two components, and may operate using wired or wireless technology. One or more of communications links 56, 58, and 60 may be, for example, electrical or optical cabling, or may be a wireless connection.

Controller 50 controls scanning device 12 so that scanner 22 is incrementally moved in equal increments along scanning range 26. Feedback unit 54 provides information to controller 50 relating to the actual position of scanner 22 along scanning range 26. Scan data collected by scanning device 12 may be stored in memory 52, or may be outputted to an external device, such as an imaging device 62, via communications link 64. Imaging device 62 may include, for example, an ink jet print engine or an electrophotographic (EP) print engine. Imaging device 62 and scanning apparatus 10 may be formed as an integral unit, referred to herein as an imaging apparatus.

Figure 2:
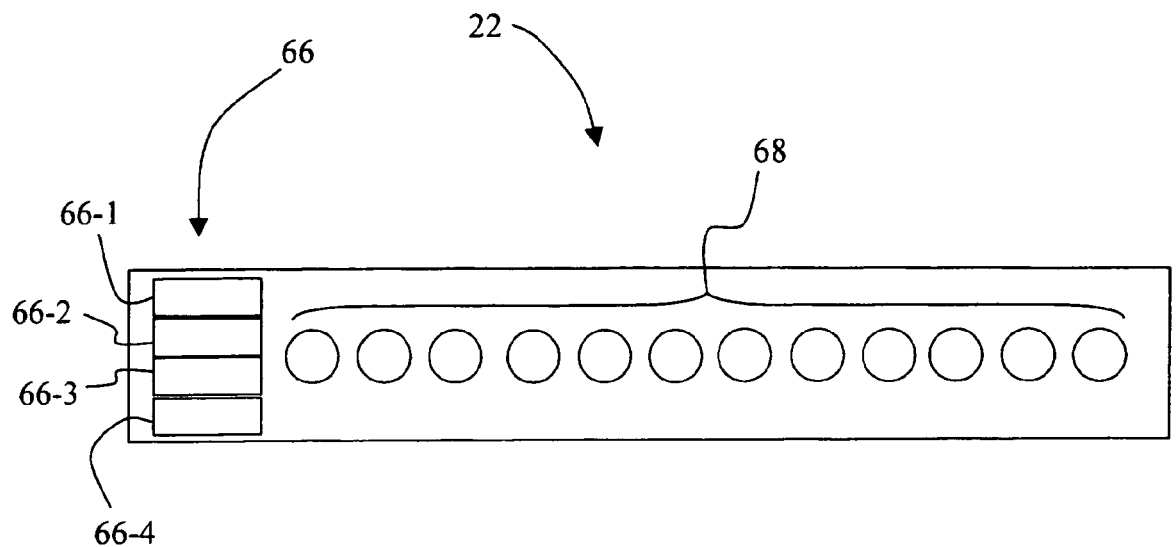
FIG. 2 is diagrammatic illustration of one embodiment of a scanner for the scanning apparatus of FIG. 1.

FIG. 2 shows an embodiment of scanner 22, in the form of a scanner bar, including a light source 66 and a plurality of light sensors 68 which are arranged to extend across the width W of document pad 20. Light source 66 and the plurality of light sensors 68 form a ultraviolet light channel and one or more visible light channels, for supplying ultraviolet image data and visible light image data to controller 50. Light sensors 68 may be configured to selectively detect both visible light in the visible light spectrum and ultraviolet light in the ultraviolet light spectrum, thereby allowing scanning apparatus 10 to distinguish between visible light and ultraviolet light.

In the embodiment of FIG. 2 as shown, scanner 22 may be in the form of a CIS scanner, wherein light source 66 includes a plurality of light emitters, which in this embodiment as shown includes light emitters 66-1, 66-2, 66-3 and 66-4. At least one of the light emitters emits ultraviolet light in the ultraviolet light spectrum, and at least one other of the other of the plurality of light emitters emits visible light in the visible light spectrum. For example, light emitter 66-1 may emit ultraviolet light, and light emitters 66-2, 66-3 and 66-4 may emit light in the visible light spectrum, e.g., red, green and blue light, respectively. Thus, when ultraviolet light emitter 66-1 is fired, sensors 68 output ultraviolet spectrum data on the ultraviolet light channel, and when light emitters 66-2, 66-3 and 66-4 are fired, sensors 68 output visible light spectrum data on the visible light channels. Each of the ultraviolet light channels and visible light channels supply their respective data to controller 50.

Alternatively, in the case that scanner 22 is in the form of a CCD scanner, light source 66 may be in the form of a fluorescent tube that emits both white light and ultraviolet light, and sensors 68 may be configured with filters to provide red, green, blue and ultraviolet spectrum data outputs on the visible light and ultraviolet channels, i.e., RGBU channels. Optionally, sensors 68 may include one or more ultraviolet specific sensors for detecting ultraviolet light.

Referring again to FIG. 1, document pad 20 is designed to have a distinct response to ultraviolet light different from that of document 23. For example, document pad 20 may have a surface 20-1 that is ultraviolet light reactive. Accordingly, surface 20-1 of document pad 20 may be made from a material that may absorb more ultraviolet light than does document 23. Alternatively, surface 20-1 of document pad 20 may be made from a material that may reflect more ultraviolet light than does document 23. As a further alternative, surface 20-1 of document pad 20 may be made from a material that may glow when receiving ultraviolet light, in contrast to document 23, which does not glow. As a result, a skew angle of document 23 on document pad 20 may be determined based, at least in part, on an interruption of the distinct response to the ultraviolet light on document pad 20 where document 23 is present. Accordingly, the present invention may be used to electronically de-skew document 23.

In addition, surface 20-1 of document pad 20 may be made from a plurality of materials having different ultraviolet light reactive characteristics. For example, the plurality of materials may be at least three materials arranged in a grid pattern, with the three materials respectively glowing when illuminated by ultraviolet light, reflecting ultraviolet light and absorbing ultraviolet light, thereby providing three distinct responses to ultraviolet light depending on the location on document pad 20.

Figure 3:
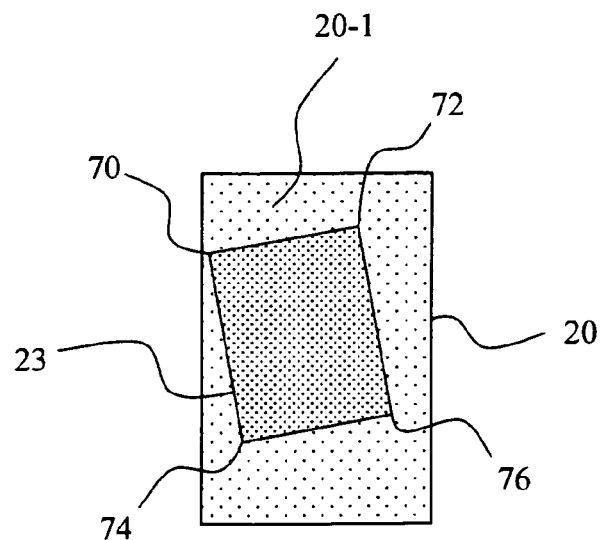
FIG. 3 is a graphical representation of a document that is skewed in relation to a document pad.

FIG. 3 shows document 23 in a skewed position with respect to document pad 20. In this example, scanner 22 will generate and send to controller 50 only data for the rectangular region bounded by corners 70, 72, 74 and 76.

In this example, the document pad 20 may be treated with a special chemical that is reactive, e.g. glows, under ultraviolet light, and appears normal white under visible light. If document pad 20 and document 23 are exposed to ultraviolet light, such as by firing ultraviolet light emitter 66-1, and a sensor of the plurality of sensors 68 records a high intensity, then this implies that a portion of surface 20-1 of document pad 20 at a location corresponding to that sensor is exposed, and in this situation, the red, green and blue LEDs of light emitters 66 are not fired and no document data is generated and recorded. Scanning then moves to the next location. When a high-to-low transition in intensity is observed by sensors 68 during the firing of ultraviolet light emitter 66-1, which implies the start of the document, then RGB data generation and recordation occurs. This occurs until a continuous high intensity is observed during the firing of ultraviolet light emitter 66-1, which signals the end of the document, and no additional RGB document data is generated and recorded. With this information, controller 50 can readily calculate the skew angle of document 23 with high accuracy. For example, assuming a rectangular document, after just a few scan lines controller 50 may have enough information to de-skew document 23 on the fly.

For example, with reference to FIG. 1, assume that scanning with scanner 22 happens from left to right and from top to bottom. As such, corner 72 is the first corner identified, and the coordinates of corner 72 are recorded by controller 50. As scanning continues from top to bottom, the coordinates of the first point on the scan lines keeps decreasing until corner 70 is reached, and the coordinates of corner 70 are recorded by controller 50. It may be observed that the coordinates of the last point on the scan lines keeps increasing until corner 76 is reached. However, controller 50 may calculate the skew angle of document 23 as soon as two corners, e.g., corners 70 and 72, are found. Accordingly, controller 50 may adjust the data scanned from corners 72 to 70 based on the skew angle. Thereafter, since the skew information has been obtained, all the remaining lines can be corrected on the fly. The steps mentioned above are simple enough to be implemented in hardware, if desired. In this scheme, the entire page is corrected for skew, and not just its contents. Advantageously, this means that the contents of document 23 will not be moved relative to page as a result of a de-skew operation.

As another example, with the present invention when a document with highlighted text is copied, the ultraviolet light causes the highlighted text to show up very clearly. Accordingly, the highlighted text is identified as such, and may be reproduced in highlighted form by imaging device 62, if equipped with highlighter ink, or imaging device 62 may print using alternative light/vivid colors of ink for the highlighted areas. Also, the ultraviolet illuminated image can also be combined with the visible light illuminated image to get a better contrast and to reduce noise.

As another example, with the present invention a particular print media type of a plurality of media types may be distinguished based on the ultraviolet light response of the print media. Accordingly, scanning apparatus 10 may include in memory 52 a database that correlates each different response to the ultraviolet light to one of the plurality of print media types. For example, the database may be in the form of a lookup table that includes data corresponding to the various ultraviolet light responses of print media, and controller 50 may execute program instructions to correlate an actual ultraviolet light response of a print media, such as document 23, to one of the lookup table entries in memory 52.

As still another example, with the present invention a particular ink type of a plurality of ink types may be distinguished based on the ultraviolet light response of the ink type. Ink type may be distinguished, for example, in terms of dye based versus pigment based, or in terms of ink color, such as vivid inks (e.g., highlight link) versus non-vivid inks. Accordingly, scanning apparatus 10 may include in memory 52 a database that correlates each different response to the ultraviolet light to one of the plurality of ink types. For example, the database may be in the form of a lookup table that includes data corresponding to the various ultraviolet light responses of the ink types, and controller 50 may execute program instructions to correlate an actual ultraviolet light response of ink on a print media, such as document 23, to one of the lookup table entries in memory 52.

As still another example, with the present invention it is possible to determine the image content or many other image enhancements. If, however, document recognition or enhancement is not desired, the ultraviolet channel can simply be turned off, or invoked intermittently, such as for example, after every 10-pixel locations. This will keep the data size small and throughput high. The ultraviolet channel sampling may be increased where the edge of document 23 is predicted so that document 23 may be adequately mapped against document pad 20.

While the present invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A scanning apparatus, comprising:
a scan bar configured to generate image data to reproduce a document scanned by said scanning apparatus, said scan bar including a light source and a plurality of light sensors, said light source and said plurality of light sensors defining at least one ultraviolet light channel and at least one visible light channel; and
a document pad for supporting said document between said light source and said document pad, said document pad having a distinct response to ultraviolet light different from that of said document.

2. The scanning apparatus of claim 1, further comprising a controller communicatively coupled to said light source and to said plurality of light sensors, said controller executing program instructions to determine a skew angle of said document on said document pad based, at least in part, on an interruption of said distinct response to said ultraviolet light on said document pad where said document is present.

3. The scanning apparatus of claim 1, wherein said document pad has an ultraviolet light reactive surface.

4. The scanning apparatus of claim 3, wherein said ultraviolet light reactive surface glows when illuminated by ultraviolet light.

5. The scanning apparatus of claim 3, wherein said ultraviolet light reactive surface reflects ultraviolet light when illuminated by ultraviolet light.

6. The scanning apparatus of claim 3, wherein said ultraviolet light reactive surface absorbs ultraviolet light when illuminated by ultraviolet light.

7. The scanning apparatus of claim 1, wherein said document pad has a surface made from a plurality of materials having different ultraviolet light reactive characteristics.

8. The scanning apparatus of claim 7, wherein said plurality of materials is at least three materials arranged in a grid pattern, said three materials respectively glowing when receiving ultraviolet light, reflecting said ultraviolet light and absorbing said ultraviolet light.

9. The scanning apparatus of claim 1, wherein said document is of a particular print media type of a plurality of print media types, wherein each of said plurality of print media types has a different response to said ultraviolet light, said scanning apparatus further comprising a database that correlates each said different response to said ultraviolet light to one of said plurality of print media types.

10. A scanning apparatus, comprising:
a scan bar configured to generate image data to reproduce a document scanned by said scanning apparatus, said scan bar including a light source and a plurality of light sensors, said light source and said plurality of light sensors defining at least one ultraviolet light channel and at least one visible light channel,
wherein said document is marked with at least one ink type of a plurality of ink types, wherein each of said plurality of ink types has a different response to said ultraviolet light, said scanning apparatus further comprising a database that correlates each said different response to said ultraviolet light to one of said plurality of ink types.

11. The scanning apparatus of claim 10, wherein at least one of said plurality of ink types is a highlight.

12. The scanning apparatus of claim 10, wherein said scanning apparatus is incorporated into an imaging apparatus.

13. An imaging apparatus, comprising:
an imaging device; and
a scanning apparatus communicatively coupled to said imaging device, said scanning apparatus including a scan bar configured to generate image data to reproduce a document scanned by said scanning apparatus, said scan bar having a light source and a plurality of light sensors, said light source and said plurality of light sensors defining at least one ultraviolet light channel and at least one visible light channel; and a document pad for supporting said document between said light source and said document pad, said document pad having a distinct response to ultraviolet light different from that of said document.

14. The imaging apparatus of claim 13, further comprising a controller communicatively coupled to said light source and to said plurality of light sensors, said controller executing program instructions to determine a skew angle of said document on said document pad based, at least in part, on an interruption of said distinct response to said ultraviolet light on said document pad where said document is present.

15. The imaging apparatus of claim 13, wherein said document pad has an ultraviolet light reactive surface.

16. The imaging apparatus of claim 15, wherein said ultraviolet light reactive surface glows when illuminated by ultraviolet light.

17. The imaging apparatus of claim 15, wherein said ultraviolet light reactive surface reflects ultraviolet light when illuminated by ultraviolet light.

18. The imaging apparatus of claim 15, wherein said ultraviolet light reactive surface absorbs ultraviolet light when illuminated by ultraviolet light.

19. The imaging apparatus of claim 13, wherein said document pad has a surface made from a plurality of materials having different ultraviolet light reactive characteristics.

20. The imaging apparatus of claim 19, wherein said plurality of materials is at least three materials arranged in a grid pattern, said three materials respectively glowing when receiving ultraviolet light, reflecting said ultraviolet light and absorbing said ultraviolet light.

21. The imaging apparatus of claim 13, wherein said document is of a particular print media type of a plurality of print media types, wherein each of said plurality of print media types has a different response to said ultraviolet light, said scanning apparatus further comprising a database that correlates each said different response to said ultraviolet light to one of said plurality of print media types.

22. An imaging apparatus, comprising:
an imaging device; and
a scanning apparatus communicatively coupled to said imaging device, said scanning apparatus including a scan bar configured to generate image data to reproduce a document scanned by said scanning apparatus, said scan bar having a light source and a plurality of light sensors, said light source and said plurality of light sensors defining at least one ultraviolet light channel and at least one visible light channel,
wherein said document is marked with at least one ink type of a plurality of ink types, wherein each of said plurality of ink types has a different response to said ultraviolet light, said scanning apparatus further comprising a database that correlates each said different response to said ultraviolet light to one of said plurality of ink types.

23. The imaging apparatus of claim 22, wherein at least one of said plurality of ink types is a highlight.

24. The imaging apparatus of claim 13, wherein said imaging device is one of an ink jet print engine and an electrophotographic print engine.

* * * * *